US 8,060,008 B2

(12) United States Patent
Kopra et al.

(10) Patent No.: US 8,060,008 B2
(45) Date of Patent: *Nov. 15, 2011

(54) MOBILE STATION AND INTERFACE ADAPTED FOR FEATURE EXTRACTION FROM AN INPUT MEDIA SAMPLE

(75) Inventors: Toni Kopra, Espoo (FI); Mikko Mäkipää, Helsinki (FI); Mauri Väänänen, Tampere (FI)

(73) Assignee: Nokia Corporation, Espoo (FI)

( * ) Notice: Subject to any disclaimer, the term of this patent is extended or adjusted under 35 U.S.C. 154(b) by 1014 days.

This patent is subject to a terminal disclaimer.

(21) Appl. No.: 11/786,659

(22) Filed: Apr. 12, 2007

(65) Prior Publication Data

US 2008/0032622 A1 Feb. 7, 2008

Related U.S. Application Data

(63) Continuation of application No. 10/820,308, filed on Apr. 7, 2004, now Pat. No. 7,221,902.

(51) Int. Cl.
*H04H 20/71* (2008.01)
(52) U.S. Cl. .................. 455/3.06; 455/3.05; 455/414.1; 455/412.1
(58) Field of Classification Search ................ 455/3.06, 455/412.1, 414.1, 414.2, 420, 550.1, 557.1, 455/556.1, 556.2, 557; 705/26, 27, 50, 51, 705/53, 54, 55, 59
See application file for complete search history.

(56) References Cited

U.S. PATENT DOCUMENTS

| | | | |
|---|---|---|---|
| 5,918,223 A | 6/1999 | Blum et al. | 707/1 |
| 6,233,682 B1 | 5/2001 | Fritsch | 713/168 |
| 6,345,256 B1 | 2/2002 | Milsted et al. | 705/1 |
| 6,385,596 B1 | 5/2002 | Wiser et al. | 705/51 |
| 6,389,403 B1 | 5/2002 | Dorak, Jr. | 705/52 |
| 6,766,523 B2 | 7/2004 | Herley | 725/19 |

(Continued)

FOREIGN PATENT DOCUMENTS

JP 10-240765 9/1998

(Continued)

OTHER PUBLICATIONS

"Overview of MPEG-7 Audio", www.tnt.uni-hannover.de, Mar. 10, 2000, 4 pgs.

(Continued)

*Primary Examiner* — Jean Gelin

(74) *Attorney, Agent, or Firm* — Dittavong Mori & Steiner, P.C.

(57) ABSTRACT

A mobile station has a processor and a user input mechanism such as a button that is operable to cause the processor to extract at least one feature from a digital media sample. The feature, such as a spectral centroid, is descriptive of an identity of a content of the media sample. Preferably, the same user input that causes the feature extraction also causes a transmitter to establish a link and to send a message to a network address, the message having a plurality of extracted features from which the digital media sample may not be reconstructed. Where a reply message identifies a media file that matches the media sample, another user input at the same or a different button causes an authorization message to be sent so that a copy of the media file, identified in the reply message and having features that exactly match the plurality of extracted and transmitted features, is downloaded to the mobile station.

27 Claims, 9 Drawing Sheets

U.S. PATENT DOCUMENTS

| | | | |
|---|---|---|---|
| 6,957,041 B2 | 10/2005 | Christensen et al. | 455/3.06 |
| 7,266,343 B1 | 9/2007 | Yli-Juuti et al. | |
| 2002/0062290 A1* | 5/2002 | Ricci | 705/59 |
| 2002/0072982 A1 | 6/2002 | Barton et al. | 705/26 |
| 2002/0083060 A1 | 6/2002 | Wang et al. | 707/10 |
| 2002/0161741 A1 | 10/2002 | Wang et al. | 707/1 |
| 2002/0187774 A1* | 12/2002 | Ritter et al. | 455/414 |
| 2002/0198789 A1* | 12/2002 | Waldman | 705/26 |
| 2004/0224723 A1* | 11/2004 | Farcasiu | 455/557 |

FOREIGN PATENT DOCUMENTS

| | | |
|---|---|---|
| JP | 2002-116768 | 4/2002 |
| JP | 2002-63209 | 8/2002 |
| JP | 2002-251411 | 9/2002 |
| KR | 2003-0059085 A | 7/2003 |
| WO | WO 02/11123 A3 | 2/2002 |
| WO | WO-03/007128 A2 | 1/2003 |

OTHER PUBLICATIONS

"Information Technology—Multimedia Content Description Interface—Part 4: Audio", International Std. ISO/IEC 15938-4, First Edition, Jun. 15, 2002, 112 pgs.

"MPEG-7 Overview", ISO/IEC JTC1/SC29/WG11 N5525, Mar. 2003, Section 3.3.

"Frequently Asked Questions", www.Shazam.com, website visited on Feb. 25, 2004.

Korean Office Action for corresponding KR application No. 10-2009-7017843, Aug. 19, 2010, pp. 1-5.

Japanese Office Action for corresponding JP Application No. 2007-504504, Oct. 1, 2009, Japan.

Korean Office Action for corresponding KR Application No. 10-2006-7022234, Sep. 29, 2009, Korea.

Chinese Office Action for corresponding CN Application No. 200580016283.8, Dec. 4, 2009, pp. 1-21.

Korean Office Action for corresponding KR 10-2009-7017843, Nov. 20, 2009, pp. 1-9.

Office Action of Corresponding Canadian Patent Application No. 2,561,147 dated Feb. 2, 2010, Canada, 3 pages.

Office Action of Corresponding Japanese Patent Application No. 2007-504504 dated Mar. 23, 2010, Japan, 8 pages.

* cited by examiner

MOBILE STATION AND INTERFACE ADAPTED FOR FEATURE EXTRACTION FROM AN INPUT MEDIA SAMPLE

PRIORITY

This application is a continuation of U.S. patent application Ser. No. 10/820,308 filed on Apr. 7, 2004, now U.S. Pat. No. 7,221,902 and claims benefit thereof under 35 U.S.C. 120.

FIELD OF THE INVENTION

The present invention relates to the field of wireless radiotelephony devices adapted to perform digital processing of an input media sample. It is specifically related to such devices and their user interfaces that are adapted to enable feature extraction from an input media sample such as a segment of a popular song.

BACKGROUND

The owners of popular music have only recently embraced downloading digital copies of their copyrighted works over electronic networks such as the internet. One popular website for doing so is http://www.apple.com/itunes/, wherein users visit the website via a personal computer (PC) or the like, manually select a song title, and download a digital version (e.g., MP3, AAC) of the selected song to the PC they used to visit the website. The user then plays the songs on the PC or transfers them to a portable device such as an iPod® or other dedicated digital music player.

A second generation of music downloading technology has recently been brought to market, wherein the user need not manually select a song by its title on a web page. Instead, the song is 'listened' to by a server or other computer associated with a website, and digitally analyzed to identify that particular song from among a database of digital music. For example, the website http://shazam.com/uk/do/help_faqs_s-hazam#4 explains its operation as follows. A user hearing a song, such as in a pub or an auto, enters a code in his/her mobile station (MS) while the song is playing. The song is sent to a hosting website such as shazam.com over a standard MS link, just as a voice input would be sent. That is, the message transmitted from the MS to the shazam.com site is the input analog music sample converted by a vocoder of the MS as any input to the microphone would be converted. The hosting website receives the (converted) raw music input, analyzes it, and matches it to one of the songs in its database. The Shazam.com technology appears limited to identifying a song at a server using a mobile station as merely a conduit that converts an analog input to digital and packetizes the converted signal, and reporting the results back to the mobile station. Further, since the Shazam.com technology does not appear to process a sample for identification purposes until after a wireless link is established, a user hearing only a latter portion of a song may not have the link established before the song ends.

Most music download services are accessed via a Personal Computer, but also mobile Over-The-Air (OTA) download services have been introduced. Mobile equipment carries limitations regarding small screen size, limited power supply, reliability and speed of data connection, which makes music discovery and delivery of the music from a music service to the mobile terminal challenging. Normally, true music service has a music collection of at least 500 000 songs. Exploring that size of music catalogue is difficult using a mobile device user interface where sequential presentation must fit the content to the screen. This makes hierarchies deep and music discovery difficult.

It is common for people to hear music in a public place, such as a pub or concert hall or car radio. Traditionally, a person becomes interested in some particular piece of music, but does not know the song's title. The person then asks friends, record shop sales staff, or happen to hear the song's name from a radio broadcast to find out the artist and title to identify the song. Some individuals may use the Shazam.com site (above) to identify the song by calling an associated service number and playing the song over their mobile station as a live 'broadcast'. The person then goes to a record store or buys the song from an Internet service based on the identification returned by Shazam.com or similar identifications service. However, there are always the following steps: 1) Hear the music sample (stimulus); 2) Identify the song; 3) Find the song for purchase (based on the identification); 4) Purchase a copy of the song; and 5) Delivery of the purchased copy and adding it to a personal music collection.

Steps 1) through 3) are manual in traditional methods. Internet-based music purchasing automates steps 4) and 5). Services such as Shazam.com automates step 2) based on an electronic 'hearing' at step 1). However, all prior art approaches known to the inventors for performing the above steps involve manual steps by the person who wishes to identify and purchase a copy of the song. The present invention seeks to streamline and automate more of the above process.

Because a greater quantity of digital files are being created and stored, there has arisen a need to standardize the way in which digital files are identified. MPEG-7 is being developed by the Moving Pictures Expert Group (MPEG) to standardize the representation of information that identifies the content of multi-media files. This is opposed to information that is the content itself, which is less amenable to categorizing and searching in databases. Whether or not MPEG-7 becomes a standardized approach, it describes a developing set of tools to efficiently index, search, and retrieve multimedia files. Such tools are used herein in an exemplary fashion in the below description of how the present invention automates the identification and purchase of music or other media.

SUMMARY OF THE INVENTION

This invention provides a mobile station or other portable electronic device and the user interface that is particularly adapted to facilitate the identification and purchasing of a media file such as a digital song file when the user has only an unidentified media sample of that media file, such as may be heard on a broadcast radio.

In one aspect, the present invention is embodied in a mobile station that includes a processor and a user input mechanism. The user input mechanism, such as a dedicated button reserved for functions related to sample identification and file purchasing as detailed below, is operable to cause the processor to extract at least one feature from a digital media sample. The digital media sample may originate from outside the mobile station, as in a digital media sample received via email or attached to a short message service message; or it may originate as an analog media sample that the mobile station converts to a digital media sample, as in the mobile receiving an input at a microphone from a broadcast FM radio. The feature is descriptive of an identity of a content of the media sample, and in that manner distinguishes over a vocoder that merely converts the media sample from one form to another.

Examples of features described herein include waveform envelope, harmonic frequency, spectral centroid, and silence, among others. Preferably, the mobile station also includes a transmitter, and the mobile station is adapted so that a single user input at the input mechanism operates to cause the processor to extract the feature, to initiate a wireless link to a network, and to cause the transmitter to transmit the feature extracted by the processor over the link. Advantageously, the mobile station preferably includes a display interface or screen by which a text identifier for the media sample is displayed. Such a display is in response to receiving a reply message at the receiver over the link from the network, where the reply message is in response to the transmittal of the extracted feature and the reply message includes an identifier of a media file that matches the media sample. Further and additional inventive aspects are described herein.

In another embodiment, the present invention is a user interface of a portable electronic device. The user interface has a user input mechanism enabled to cause a processor, which is internal to the portable electronic device, to cause two actions upon a single user entry at the user input mechanism. That single user entry causes a plurality of features to be extracted from a digital media sample, and causes the plurality of extracted features to be transmitted outside the device. The digital media sample may be input as such into the device, or the device may convert to digital an analog media sample that is input. The user interface further includes a display screen to display a text identifier of a media file to which the media sample corresponds, that is, for which features that might be extracted form the media file exactly match the plurality of extracted and transmitted features. However, this is not to imply that the mobile station actually extracts features form the media file and compares them to features extracted form the digital media sample. The text identifier is displayed in response to receiving a reply message that is itself a reply to the transmitted features. Preferably, the user input mechanism may also causes an authorization message to be transmitted outside the device following receipt of the reply message. The authorization message includes a media file identifier received in the reply message and a request to download a copy of the media file to the portable electronic device. However, this authorization message is preferably not also initiated upon the user input that initiated the feature extraction and transmittal.

These and other aspects and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

FIG. 3A represents steps within a mobile station, FIG. 3B represents steps within a server, FIG. 3C represents steps within a server that provides downloads of media files for purchase, and FIG. 3D represents further steps in the mobile station in response to the server.

DETAILED DESCRIPTION

Figure 4A:
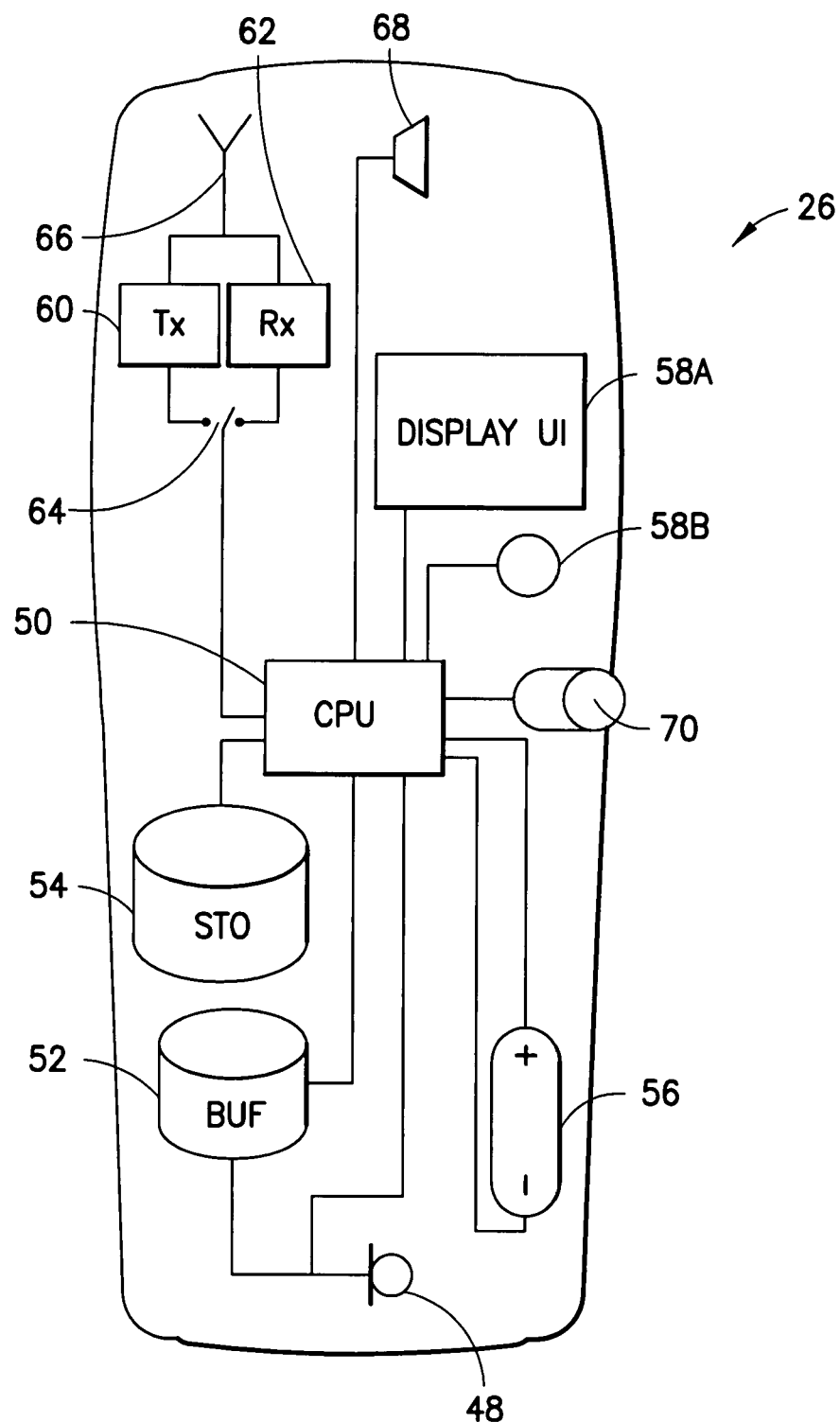
FIG. 4A is a block diagram schematic of a mobile station particularly adapted according to the teachings of this invention.
Figure 4B:
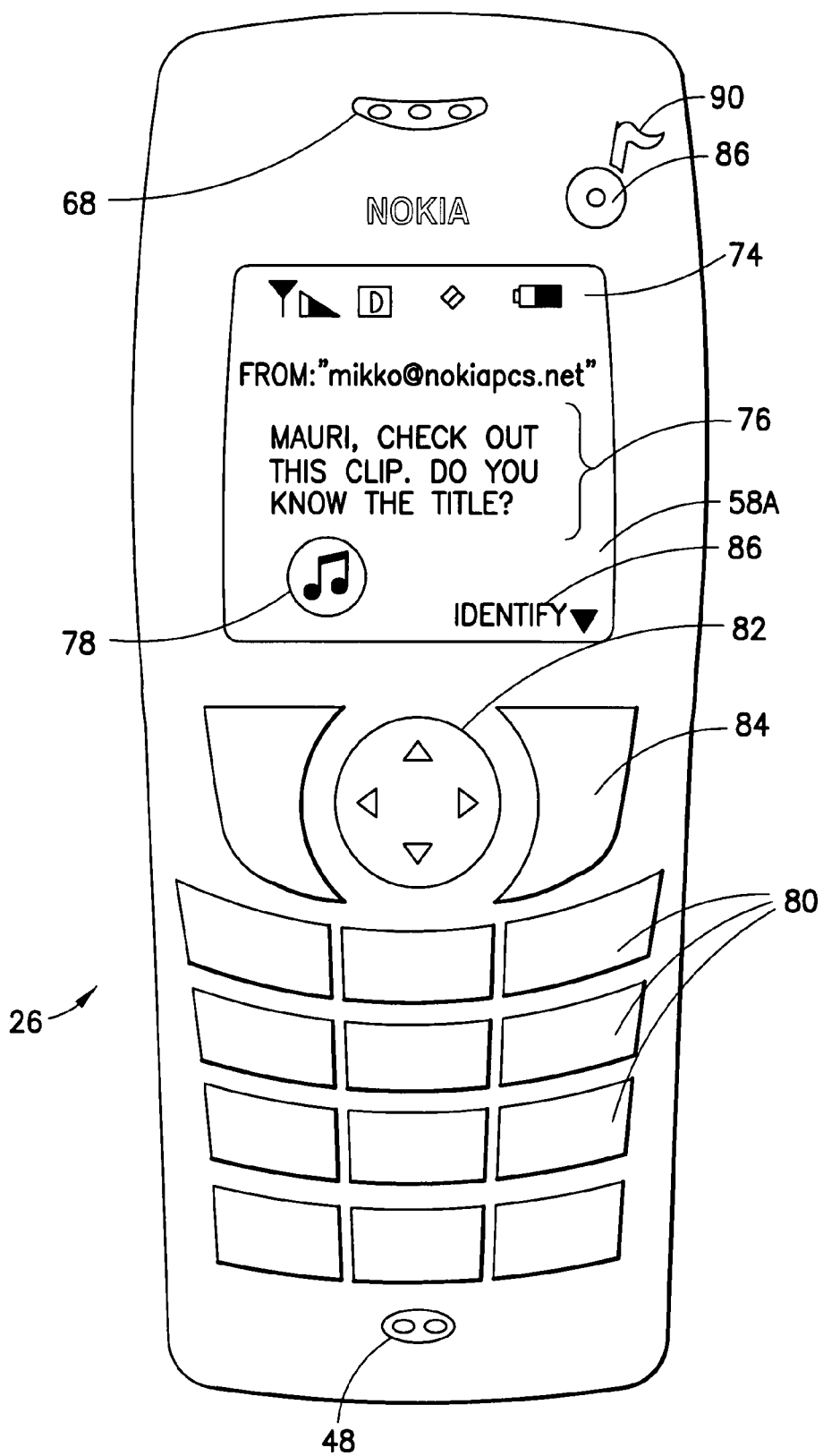
FIG. 4B is a plan view of a mobile station detailing a user interface according to the present invention, including a dedicated media sample recognition button.
Figure 5:
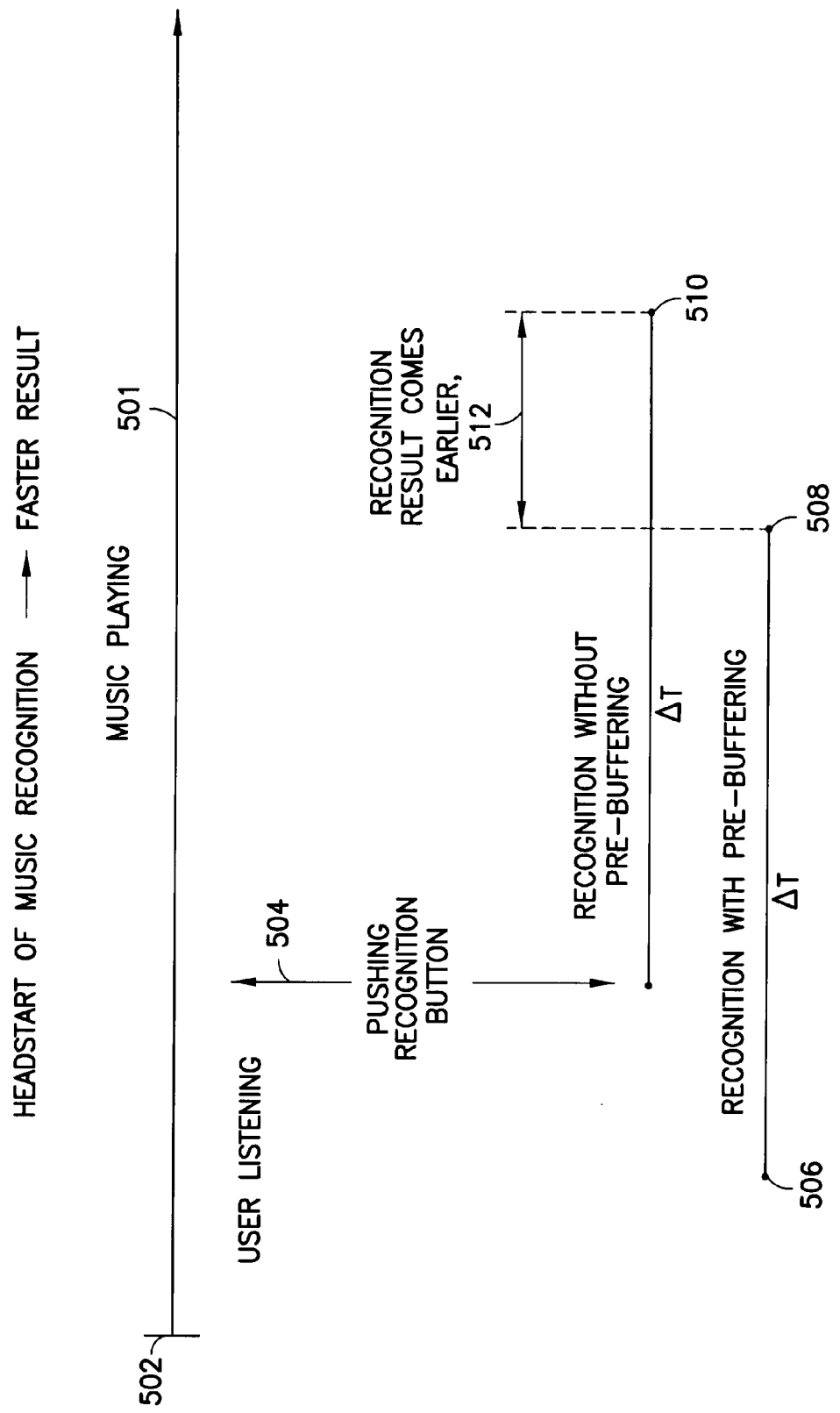
FIG. 5 is a schematic timing diagram illustrating the advantage in continuously buffering input at the mobile station.

The present invention is directed to a mobile station (or other portable electronic device) having mobile telephony capability, and its user interface. The user interface enables a user to easily identify a media sample that is input into the media station by any means, such as an analog sample input via a microphone or a digital sample input via a received email or uploaded via a cable connection with a PC. FIGS. 1 and 3A-3D and related text describe the system in which the MS preferably operates, and are the subject of co-pending and co-owned U.S. patent application Ser. No. 10/810,924, filed on Mar. 26, 2004. FIGS. 2A-2B describes distributed feature extraction for purposes of identifying the subject media sample, FIG. 2A describing the MS portion. FIGS. 4A-4B and 5 relate most particularly to the MS and user interface of the present invention.

An explanation of terminology used herein will enlighten the below detailed description. A media sample is a portion, of any size, of an audio, visual, or audio/visual signal on which analysis is performed. The media sample may be analog (as in a humanly discernible segment of music received at a transducer of the MS or a broadcast FM radio signal received at an analog radio receiver integrated with the MS), or it may be digital (as in a file downloaded or uploaded to the MS over a cable or wireless link). The below description is in the context of a time-bounded segment of a song, for example, a continuous or coherent ten-second segment of a three-minute song commonly played over a conventional FM radio. A feature of that sample, or a digital version of it, is a digital marker, descriptor, or other identifier of the content of the sample that may be gleaned or extracted from a digital analysis of it. A timepoint is a chronological instant within the sample. Features are often associated with timepoints. For example, a maximum amplitude in a sample occurs at only one timepoint; a repeated frequency pattern may begin at timepoints spaced at equal intervals; a characteristic percussion sequence may occur only at a fixed offset time from the end of an identifiable bass sequence. A more detailed description of features is presented below. Features are extracted from samples in order to quantify various characteristics of the sample. In the example of music, features of a song sample are extracted in order to search a database of songs and identify the sampled song's title (or version, artist, etc.) from among many thousands or even millions. Where the database includes features that have been previously extracted from the entire song, a one-to-one comparison may be made between the features extracted from the current sample and the previously extracted features. In this manner, a song can be identified by only a comparatively small sample of the whole. While features may be extracted from a media sample or a digital version of that sample, additional features may be extracted from the already extracted features. For example, a first set of features extracted from a media sample or a digital version of that sample will exhibit a certain auto-correlation among themselves. That autocorrelation is determined by an analysis of only the first set of extracted features.

Figure 1:
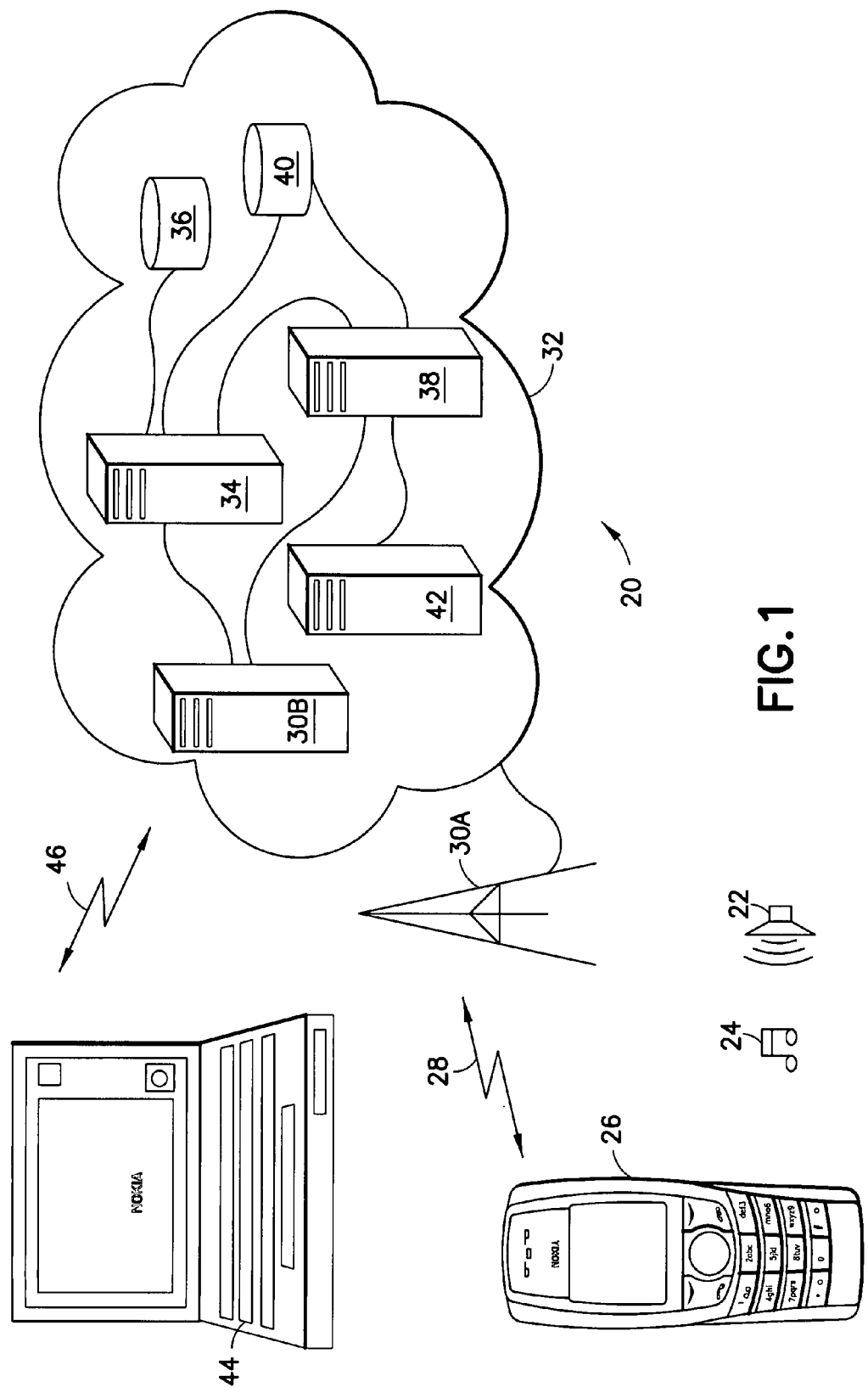
FIG. 1 is a schematic overview of a communication system within which the present invention may operate.
Figure 2A:
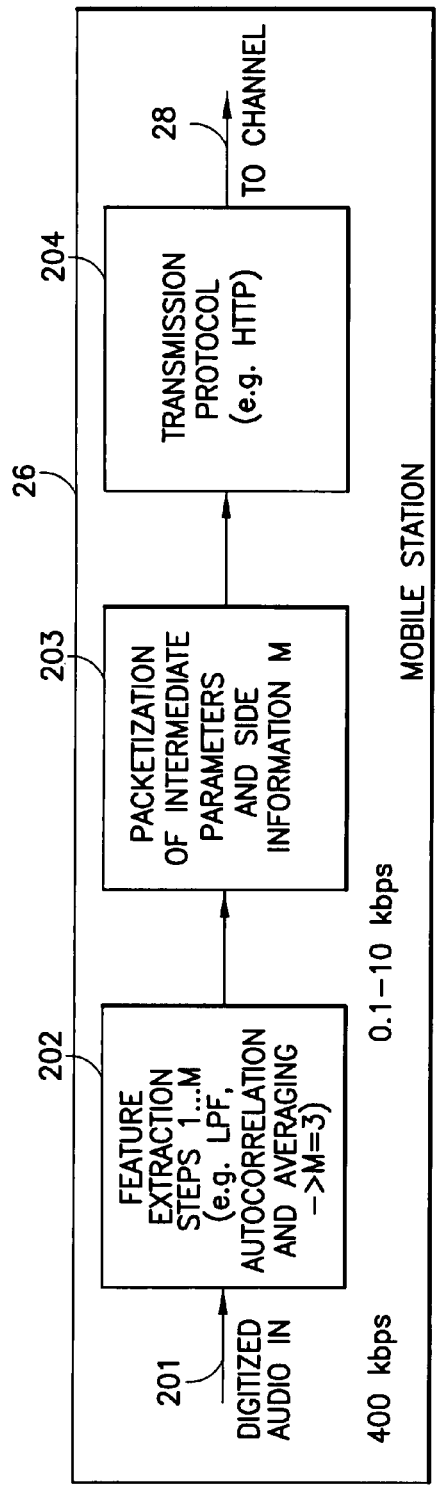
FIGS. 2A-2B are block diagrams representing feature extraction of a media sample distributed among a mobile station and a server, respectively.
Figure 2B:
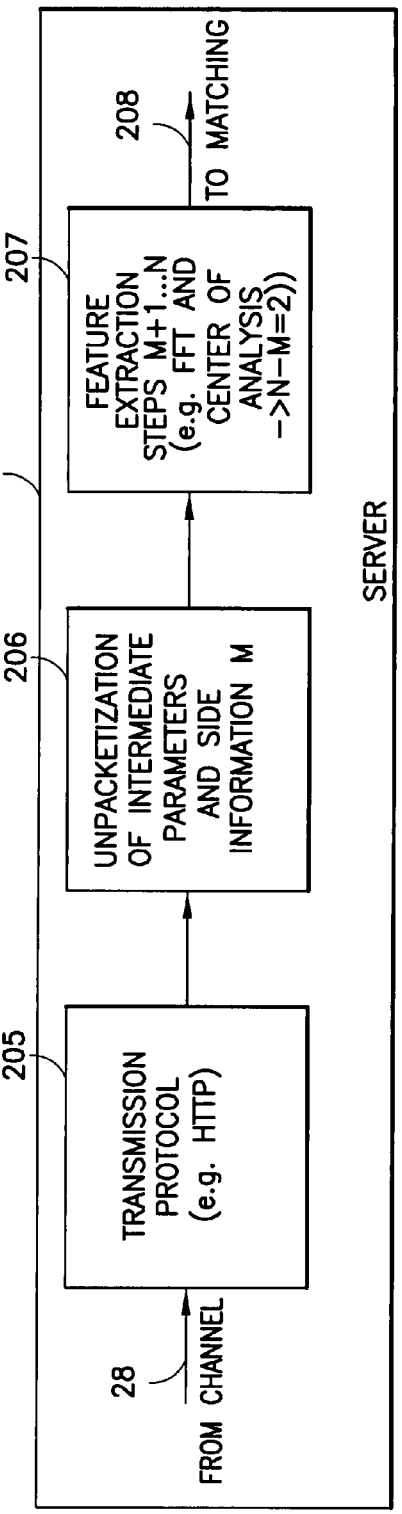

A communication system 20 in which the present invention operates is illustrated at FIG. 1. A media source 22 such as a FM radio provides a media sample 24 such as a portion of a song. A mobile station MS 26 or similar such portable device with wireless communication capability, especially wireless telephony capability, receives the media sample 24 for digitizing, processing and transmittal. Though the MS 26 may receive the entire song, the media sample or its digitized version is the portion on which the MS 26 operates according to the present invention. The MS 26 creates a digital version of at least some of the media sample 24, extracts one or more features from it, and transmits those features over a wireless link 28 to a communication service 30 that includes a base station 30A in communication with a communications server 30B.

The communication service 30 receives calls from the MS 26 at the base station 30A, keeps track of them and redirects the transmission from the MS 26 to a commercial song recognition service 34. The communication service may or may not alter the exact signal received from the MS 26 (such as to decode, decompress, identify and correct errors and the like), depending upon the type of communication regimen in use, but does not alter the underlying substantive data, the features being transmitted. In addition, the communication service 30 carries out composing a short response message for the MS 26 to receive, as detailed below.

The song recognition service 34 receives the MS 26 transmission through the communication service 30. That transmission preferably includes features of the media sample 24 that are further analyzed at the song recognition service 34. Alternatively, the MS-extracted features are transmitted with another segment of the sample, from which the recognition service 34 extracts additional features. As processing power and battery efficiency in MS's increase, the transmission from the MS 26 may include a set of features comprehensive enough that no further feature extraction by the recognition service 34 is required. In no instance is the transmission merely a telephonic live feed of the entire media sample 34 through the MS 26. Regardless, the song recognition service 34 receives the transmission, may extract further relevant features from the message received from the MS 26, and combines them with the MS-extracted features received in that message.

A song signature database 36, which may or may not be one with the song recognition service 34, provides a database against which the full set of features extracted from the media sample 34 (by both the MS 26 and the recognition service 34) are compared. This database preferably stores, for each of numerous files, a plurality of features extracted from an underlying media file or sample thereof. These stored feature sets may be used to uniquely identify the underlying file from which the media sample 24 is drawn from among all others in the signature database 36. Alternatively, the signature database 36 may store, for each file or song, several extracted non-unique features and a reference sample (the combination of which uniquely identifies the underlying file or song), or any other means by which to uniquely identify one song or file in the database from other songs or files.

The song recognition service 34 compares the original sample with stored samples in the song signature database 36, and seeks to find only one match for the features transmitted by the MS 26 in the song signature database 36. Where the MS 26 and the recognition service 34 each extract features, the song recognition service 34 performs two separate functions: search the database using the extracted features, and extracting further features from the transmitted portion of the media sample. Preferably, the recognition service 34 performs these two functions in parallel. When the song recognition service 34 initially searches the signature database 36 using only the features previously extracted by the MS 26, a unique song may not be identified but the potential matches in the signature database 36 will be reduced to a substantially smaller subset, depending upon the number of features used in that initial search. Simultaneously, the recognition service 34 extracts additional features from that portion of the media sample 24 sent by the MS 26. As each additional feature is extracted, the subset of potential matches is reduced until only one unique match is found. At that point, the recognition service 34 terminates further feature extraction, and the total processing required for to match the media sample 24 to a media file in the signature database 36 is minimized.

Alternatively, the recognition service 34 may instead first extract additional features from the message transmitted by the MS 26, compile the extracted features with those received from the MS 26, and execute only one search of the entire signature database 36 to find a unique match. The choice is based on a market-driven balance of responsiveness to the user (time to search the database) and available processing power at the recognition service to extract additional features from numerous simultaneous messages from many MS's.

Once a unique match is found, the recognition service 34 sends a sample identification message (which may also be a not identified message where no match is found) to the MS 26 through the communication service 30. The MS 26 displays the song title and artist on a display user interface UI to inform the user of the name of the song or other media file.

Preferably, the present invention is extended beyond merely identifying the song or media file but to automatically provide a link by which a user can purchase a copy of that identified media file that is downloaded to the customer at the MS 26. Alternatively, it may be adapted to provide a first copy to the MS 26 and a second copy to another device such as a personal computer 44, where each copy is tailored to the type of link 28, 46 available on the download. This is advantageous in that the first copy may be the identified media file compressed with a codec that optimizes for the more limited storage and sound reproduction capability at the MS 28 (as well as bandwidth considerations), and the second copy of that same underlying media file may be compressed with a second codec that optimizes for the greater bandwidth available in a link 46 to the PC 44. The customer may then upload the second copy to a dedicated portable digital music device such as a Rio® or iPod® for high fidelity portable music. The details of such a two-copy download alternative are the subject of co-owned U.S. patent application Ser. No. 10/792,547, filed on Mar. 2, 2004, and herein incorporated by reference.

Providing a copy of the identified media file to the user requires the cooperation of a file or song storage database 40 that stores the actual files or songs to be downloaded. Where the signature database 36 stores features and file/song identification (such as title/author that may be sent to the MS 26 after a match is found), the file/song storage database 40 stores the actual files/songs that correspond to the features matched in the signature database 36. The two databases 36, 40 may be combined into one though they need not be; the identification from the signature database 36 may be used to readily select a unique file/song from a separate file/song database 40. The file/song from the latter database 40 is the one that is downloaded to the user when the present invention is extended as above to provide a copy of the song as well as its identification to the user of the MS 26, preferably after file compression.

When a song is to be so downloaded, preferably a music service 38, that is coupled to the song database 40 in the network 32, receives a request from the MS 26 and responds with the requested file (song, image, text etc.) and metadata for presenting the file in a described form (styles, templates, scripts etc.). The music service 38 queries data from the song storage database 40. Since the MS 26 is coupled to the network 32 through the communications service 30, the file passes through it enroute to the MS 26.

A download service 42 may also be included to manage all individual download transactions initiated from the MS 26 through the music service 38. The download service 42 tracks each download of files from the storage database 40 to track billing and comply with copyright restrictions. The invention contemplates an end-to-end transaction that is automatically executed upon a single entry at a user interface UI of the MS 26, such as a single depression of a button or soft key. In this end-to-end embodiment, that single entry initiates capture of the media sample, feature extraction and call establishment in the MS 26, and transmission of the extracted features and a portion of the media sample from the MS 26. A song is identified by the extracted features (some extracted by the MS 26, some extracted by the recognition service 34) using the signature database 36, and either the music service 38 or the recognition service 34 sends a message to the MS 26 that identifies the song (e.g., title and artist) to the MS user.

The message also provides a link to the music service 38 so that, with preferably one more single entry at the MS 26, the user can request to download the song to the MS 26. The music service stores the song identifier (which may or may not be the title/artist, as this will be used to digitally select a song from the song database 40), or transfers it to the download service 42 that then stores it. When the MS 26 requests download of the song, the music service 38 selects the matched song from the song database 40, informs the download service 42 which arranges billing to the user of the MS 26 through the communication service server 30B, and the music service 38 provides the identified song from the song database 40 to be downloaded to the MS 26. The user may access the music service 38 directly from the MS 26 using the link provided in the identification message, or may use the link from the PC 44 to obtain a higher fidelity version (different compression codec) of the song since it will be downloaded via a broadband or other PC link 46 that, in current practice, is generally not as constrained in bandwidth as the wireless mobile telephony link 28.

FIGS. 2A and 2B broadly describe the analysis of the media sample among distributed components of the communications system 20. FIG. 2A illustrates in block diagram operations within the mobile station 26. The media sample 24 is digitized 201 as any other input to the MS 26, and the MS 26 establishes a data connection (e.g., via a wireless link 28 and a network 32) to the server such as one operated by the song recognition service 34. The MS 26 begins preprocessing 202 the digitized audio input signal 201 and extracts features from it, which will be later sent as data packets to the server. Optionally the MS 26 has been buffering the audio input continuously so that the preprocessing 202 can start on a signal that was input at a time preceding the push of a recognition key or other user entry to initiate the process. In most cases the user has already been listening to the song for some time before pushing the recognition key.

The features used for the recognition can be e.g. spectral flatness, spectral centroid, rhythm and/or melody. Features characterize the content of the media file or sample so as to classify and identify the file, and are not merely digital reformulations of the (analog) media sample 24 that is input into the MS 26. Though the MS 26 digitizes the input media sample 24 such as by the use of a vocoder, that alone is not feature extraction. Preferably, features are non-reconstructive. That is, the original media sample cannot be reconstructed merely by re-processing or otherwise manipulating features extracted from it. Non-reconstructive features describe and identify the content of the media file, but cannot recreate that content. Not all features need be non-reconstructive, but extracting non-reconstructive features at the MS 26 yields a smaller packetized message to send over a wireless link than reconstructive features in most if not all instances.

Suitable features have been described e.g. in the MPEG-7 standard (ISO/IEC 15938, especially ISO/IEC 15938-4, INFORMATION TECHNOLOGY—MULTIMEDIA CONTENT DESCRIPTION INTERFACE—PART 4: AUDIO for the audio-related embodiments herein), herein incorporated by reference. Literature relating to MPEG-7 uses the term descriptors to represent features that are extracted directly from a media sample, such as may be performed by the MS 26 according to the present invention. MPEG-7 literature uses the term description scheme DS or description tools to describe features extracted from descriptors. Where descriptors are low-level analysis of a digital version of a media sample, description schemes are high-level analysis (e.g., drawn from an interrelationship between descriptors but not from the sample directly). MPEG-7 is currently under refinement, so the following is a summary of certain descriptors and description schemes currently contemplated for that standard and relevant to the present invention.

Descriptors are the representations of low-level features, the fundamental qualities of audiovisual content, such as statistical models of signal amplitude, fundamental frequency of a signal, an estimate of the number of sources present in a signal, spectral tilt, emotional content, an explicit sound-effect model, and any number of concrete or abstract features. In the preferred embodiment of the invention, the MS 26 extracts descriptors.

Description Schemes are structured combinations of Descriptors. This structure may be used to annotate a document, to directly express the structure of a document, or to create combinations of features which form a richer expression of a higher-level concept. For example, a classical music DS may encode the musical structures (and allow for exceptions) of a Sonata form. Various spectral and temporal Descriptors may be combined to form a DS appropriate for describing timbre or short sound effects. In the preferred embodiment of the invention, a server on the network 32 extracts the description schemes.

A descriptor may be considered to define the syntax and the semantics of one representation of a particular characteristic of the content of a media sample. For example, the color of an image file is a characteristic. A feature may be a descriptor or a characteristic, where descriptor is the more basic of the two and a particular characteristic may be only fully described by several descriptors. Possible descriptors associated with the characteristic 'color' include: color histogram, red-green-blue (RGB) vector or a string. The MS 26 may extract a value for a particular descriptor, an instantiation of a descriptor for a given value set. For example, RGB=(255, 255, 255), colorstring="red". Certain descriptors are relevant or valid with one type of media file but not another. For example, descriptors for a visual media sample may include: grid layout and histogram within a basic structure characteristic; color space, dominant color, color histogram and color quantization within a color characteristic; spatial image density distribution and homogeneous texture within a texture characteristic; object bounding box, region-based shape, contour-based shape and 3D shape descriptor within a shape characteristic; and camera motion, object motion trajectory, parametric object motion, motion activity and motion trajectory aspects (e.g., speed, direction, acceleration) within a motion characteristic. Descriptors relevant to an audio sample may include: lattice of words and phonemes plus metadata in a speech annotation characteristic; ratio of even to odd harmonics and harmonic attack coherence in a timbre feature; and melodic contour and rhythm within a melody characteristic.

Currently, there are seventeen temporal and spatial descriptors in MPEG-7 for describing audio samples: basic, basic spectral, signal parameters, timbral temporal, timbral spectral, and spectral basis. Additionally, a silence descriptor has proven valuable in identifying the content of an audio sample. The two basic audio Descriptors are temporally sampled scalar values for general use, applicable to all kinds of audio samples. A waveform Descriptor describes the audio waveform envelope (minimum and maximum), typically for display purposes. A power Descriptor describes the temporally smoothed instantaneous power, which is useful as a quick summary of a signal or sample, and in conjunction with the power spectrum.

The four basic spectral audio Descriptors all share a common basis, all deriving from a single time-frequency analysis of an audio signal or sample. They are all informed by the first Descriptor, an AudioSpectrumEnvelope Descriptor, which is a logarithmic-frequency spectrum, spaced by a power-of-two divisor or multiple of an octave. This AudioSpectrumEnvelope is a vector that describes the short-term power spectrum of an audio sample. It may be used to display a spectrogram, to synthesize a crude "auralization" of the data, or as a general-purpose descriptor for search and comparison. Other spectral audio Descriptors represent the center of gravity of the log-frequency power spectrum (centroid or shape), spectrum spread about the centroid, and spectrum flatness for each of a number of frequency bands or bins.

Two signal parameter Descriptors apply chiefly to periodic or quasi-periodic signals. These describe the fundamental frequency of an audio sample (a confidence measure) and its harmonicity (to distinguish, e.g., musical tones or voiced speech, metallic or bell-like sounds, fricatives like 'f', or dense mixtures of instruments).

Two timbral temporal Descriptors describe temporal characteristics of segments of sounds, and are especially useful for the description of musical timbre, the characteristic tone quality independent of pitch and loudness. One such descriptor characterizes the "attack" of a sound (the time it takes for the signal to rise from silence to the maximum amplitude), and another characterizes the signal envelope or centroid, representing where in time the energy of a signal is focused. The latter Descriptor may, for example, distinguish between a decaying piano note and a sustained organ note, when the lengths and the attacks of the two notes are identical.

Five timbral spectral Descriptors are spectral features in a linear-frequency space especially applicable to the perception of musical timbre. One is a power-weighted average of the frequency of the bins in the linear power spectrum, and is similar to the centroid descriptor noted above, but distinguishes the "sharpness" of a sound for different musical instruments. The remaining timbral spectral Descriptors operate on the harmonic regularly-spaced components of signals or samples. For this reason, the descriptors are computed in linear-frequency space, and include spectral centroid, spectral deviation, and spectral spread descriptors.

Two spectral basis Descriptors represent low-dimensional projections of a high-dimensional spectral space to aid compactness and recognition. One such Descriptor is a series of (potentially time-varying and/or statistically independent) basis functions that are derived from the singular value decomposition of a normalized power spectrum. Another represents (when combined with the first) low-dimensional features of a spectrum after projection upon a reduced rank basis. The silence segment simply attaches the simple semantic of "silence" (i.e. no significant sound) to an Audio Segment. Although it is extremely simple, it is a very effective descriptor. It may be used to aid further segmentation of the audio stream, or as a hint not to process a segment.

Together, the descriptors may be used to view and to represent compactly the independent subspaces of a spectrogram. Often these independent subspaces (or groups thereof) correlate strongly with different sound sources. Thus one gets more salience and structure out of a spectrogram while using less space.

The Description Schemes DSs reflect interrelationships between descriptors, or among the same type of Descriptors over several frequency bins or spectral slices. In that manner, DSs exchange some degree of generality for descriptive richness. Once a sufficient number of Descriptors are extracted from a sample or a segment of that sample at the MS 26, there is no need to transmit the digitized audio sample; the recognition service 34 needs only the extracted features from which to extract additional features. These additional features are, in certain embodiments of the invention, akin to the DSs of MPEG7. For example, an audio signature DS statistically summarizes the spectral flatness Descriptor. This can provide a unique content identifier for the purpose of robust automatic identification of audio samples.

Timbre DSs aim at describing perceptual features of instrument sounds. Timbre is the perceptual features that make two sounds having the same pitch and loudness sound different. Timbre DSs describe these perceptual features with a reduced set of Descriptors, which may relate to notions such as "attack", "brightness" or "richness" of a sound, to harmonic, coherent, sustained sounds, and non-sustained sounds for a particular instrument or instrument group (percussion), and the like. Another timbre DS compares a timbral temporal Descriptor with a spectral centroid Descriptor using a distance metric.

Melody DSs include a rich representation for monophonic melodic information to facilitate efficient, robust, and expressive melodic similarity matching, and includes a melody contour DS (a 5-step contour representing the interval difference between adjacent notes where intervals are quantized into large or small intervals, up, down, or the same) for extremely terse, efficient melody contour representation, and a melody sequence DS (an expanded descriptor set and higher precision pitch interval encoding) for a more verbose, complete, expressive melody representation. Either or both may be expanded to include supporting information about the melody. Arrayed about these core Descriptors are a series of optional support Descriptors such as lyrics, key, meter, and starting note, to be used as desired by an application.

Some "recognition" DSs are specifically to aid in searching and indexing the underlying media files, and use the low-level spectral basis Descriptors as their foundation from which is formed a statistical model, such as a hidden Markov or Gaussian mixture model. The resulting probabilistic classifiers may recognize broad sounds classes, such as speech and music, or they can be trained to identify narrower categories such as male, female, trumpet, or violin. Other applications include genre classification and voice recognition. Further DSs detail spoken content within an audio stream.

Further details as to features that may be extracted may be found at U.S. Patent Application No. US 2002/0083060 A1, published on Jun. 27, 2002, and incorporated herein by reference. The amount of preprocessing 202 in the MS 26 can range from none to complete extraction of feature vectors. The whole feature extraction process for each feature is preferably divided into several stages, some of which reduce the amount of data later sent as compared to a non-extracted signal (e.g., the 'live' music sample 24 received at the MS 26). For example, the first stage for a spectral feature can be estimation of the autocorrelation of the digitized input signal 201 by calculating instantaneous autocorrelation vectors and averaging them over a period of time. The next stages then can perform a Fourier transform and process that further. The whole feature extraction process is divided between the MS 26 and the server 34. The MS 26 selects the number of stages it performs, and packetizes 203 the number M of stages performed as side information, along with the results of the preprocessing (the MS-extracted features). Preferably, the MS 26 adaptively selects the number and/or type of features it extracts, which may be based on the type of media sample (audio, video, still image, etc.) and/or the channel characteristics over which it will transmit those extracted features. A segment of the media sample 24 from which no features have been extracted by the MS 26 may also be transmitted from the MS 26 as above for further analysis at the recognition service 34, as above. Packets are encoded 204 in accordance with a typical wireless protocol (constellation mapping, error correction, etc.). A suitable balance between the processing power and transmission bandwidth is selected based on the access network 32 and capabilities of the MS 26. The encoded packets are transmitted over the wireless link 28 via one or more channels.

As shown in FIG. 2B, the packets are received and decoded 205. Decoding specific to the wireless link 28 may be done by the communication server 30B and opening 206 of the individual packets may be done by the song recognition service 34 in an end-to-end voice-over internet protocol arrangement. The server of the song recognition service 34 then extracts further parameters 207 required for identification of the song, which can be extracted from the features received from the MS 26 and/or from a segment of the digitized media sample also received from the MS 26. In the example of FIGS. 2A-2B, a total of N>M features are extracted to enable a positive identification of the media sample. A number of M features are extracted by the MS 26, and the remaining N-M features are extracted by the server 34, where M preferably represents lower level features and N-M represents higher level features that are extracted from the lower level features and not from a digitized version of the media sample. The song recognition service server 34 then makes a comparison 208 between the extracted features and feature sets, each representing an underlying media file, stored at the song signature database 36. Ideally, one and only one feature set in the database will match the group of extracted features, and the feature set that so matches represents the file from which the media sample was taken. Based on extracted features, the media sample 24 is recognized by a comparison of its N extracted features against the feature vectors or feature set for the underlying file provided by the song signature database 36.

Figure 3A:
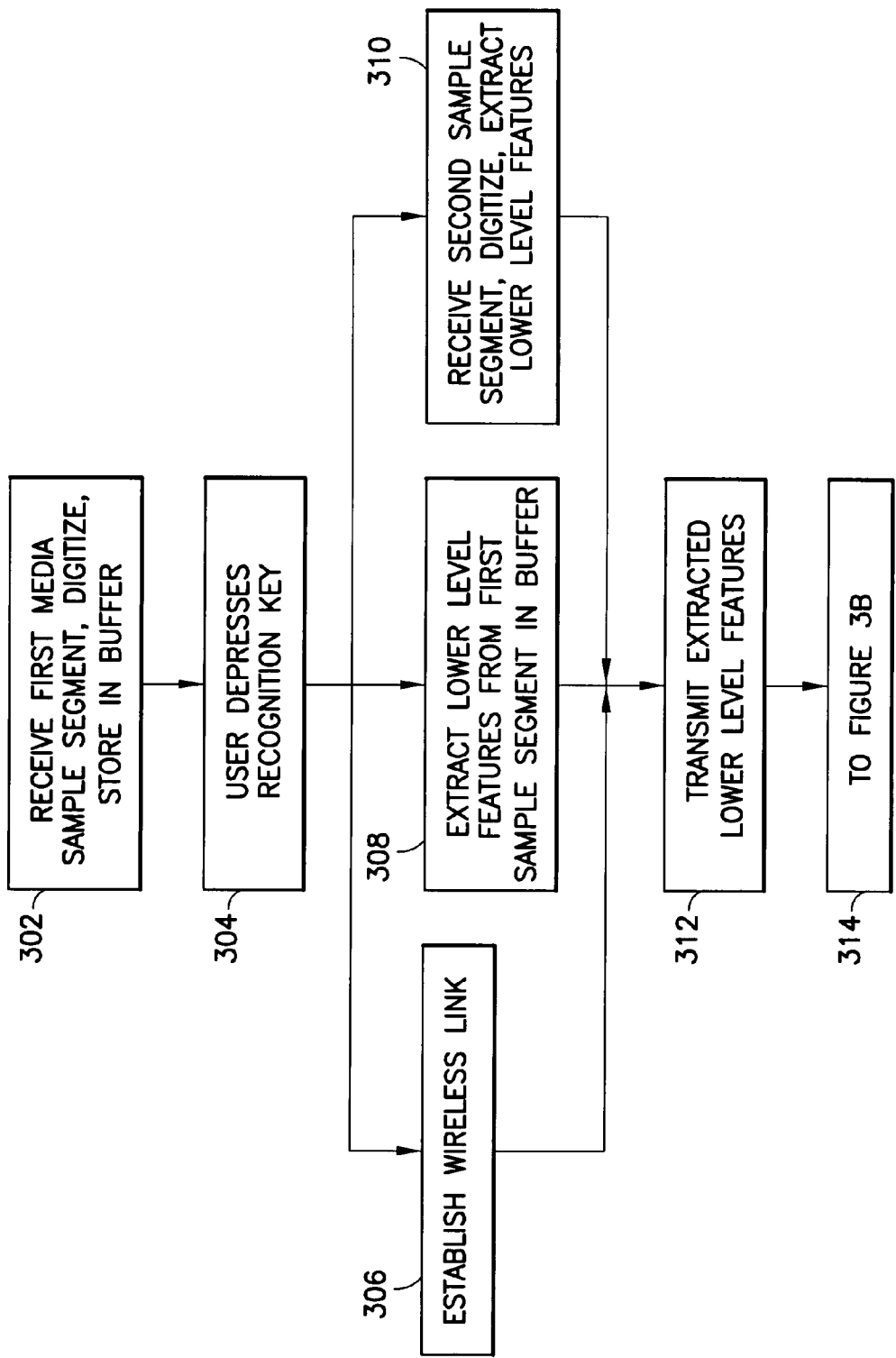
FIGS. 3A-3D are portions of a continuous flow diagram detailing actions taken in the communications system of FIG. 1.

FIGS. 3A-3D illustrate in flow diagram form the various steps or the preferred embodiment of the method according to the present invention, each flow diagram linked to another as indicated. FIG. 3A describes the method within a MS 26 as the media sample 24 is initially received and processed. In this embodiment, the media sample is parsed into two segments, one of which is stored in a buffer of the MS 26 and the other of which is processed in real time as received at the MS 26. A first media sample segment is received 302 at the MS 26, digitized, and stored in a buffer. This storing is continuous as no user input yet informs the MS 26 that it should perform an analysis or otherwise process the input in accordance with the teachings herein. A user depresses a recognition key 304, triggering the MS 26 to perform three functions preferably simultaneously: the MS 26 establishes 306 a wireless link 28 to a base station 30A, it extracts 308 lower level features from the buffered first segment of the media sample 24, and it receives 310 a second segment of the media sample, digitizes it, and extracts lower level features from it. The second segment may be transiently stored. The MS 26 then transmits 312 the extracted features (and the number of steps performed by the MS 26 in extracting a particular feature if applicable, as noted above) over the wireless link 28 established at step 306. Alternatively, features are extracted from the first segment, possibly also the second segment, and the extracted features are transmitted along with the second segment, which may only be a spectral slice or a series of spectral slices of the digitized media sample. The method is continued 314 at FIG. 3B.

Figure 3B:
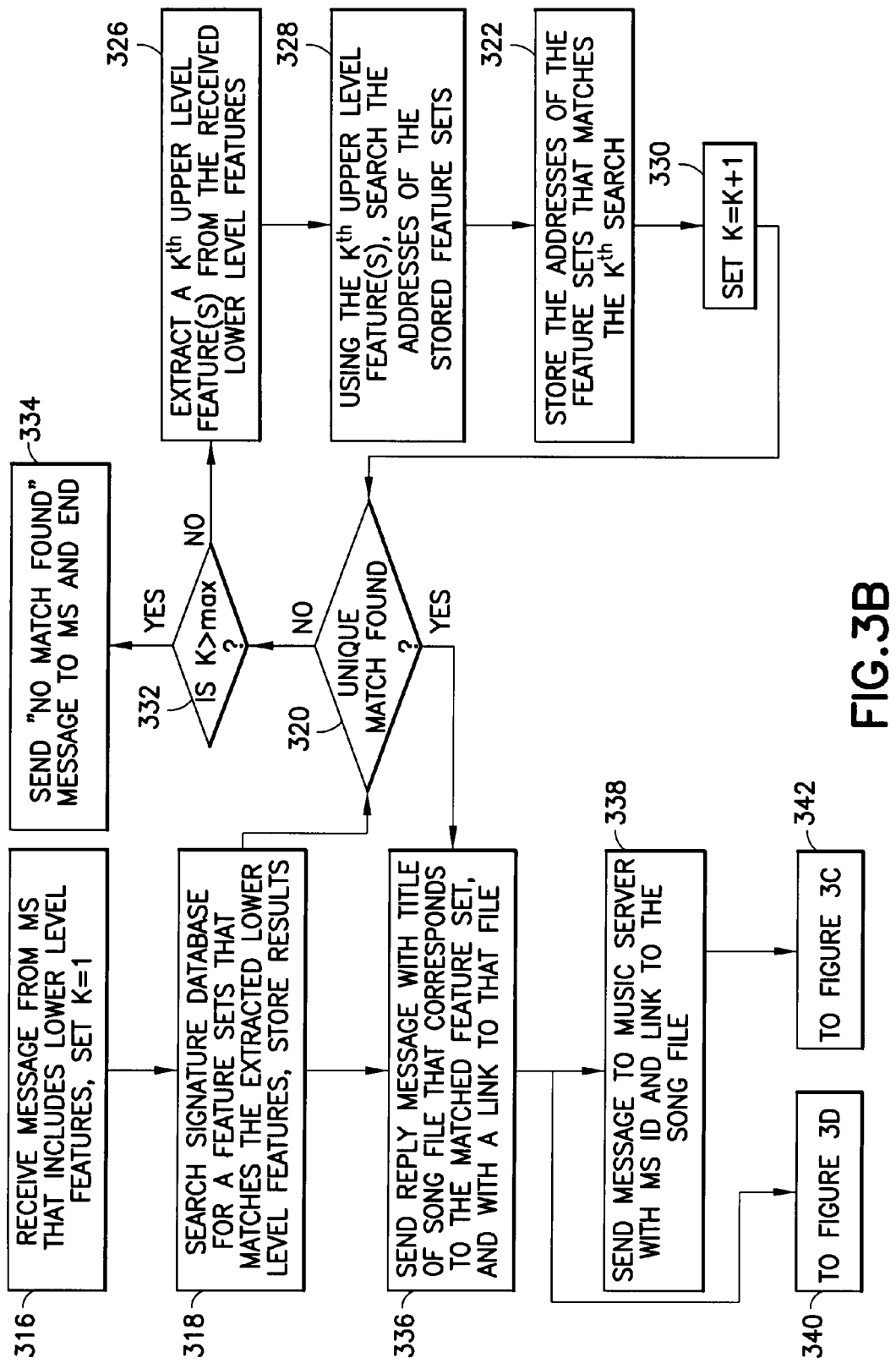

FIG. 3B details steps at the network 32 side of the system 20. The server 34 receives 316 a message from the MS 26 that was transmitted at step 312 of FIG. 3A. A communication server 30B may decode the wireless specific portion of the packetized message, and preferably merely re-transmit over the network 32 the unopened packets carrying the substantive data. The song recognition service 34 opens the packets, receives the already extracted lower level features, and searches 318 the signature database 36 for a file bearing a feature set that matches those lower level received from the MS 26 for a unique match 320. The results of that search are stored temporarily. If no unique match is found using only the MS-extracted features, an index K (initialized at block 316) is compared against a maximum, and if not exceeded, one or more upper level features are extracted from the received lower level features at block 326. At block 328, the those feature sets from the database that matched the MS-extracted features (and stored temporarily at block 318) are searched using the $K^{th}$ server-extracted feature, so that the entire database 36 need not be searched again in the current search iteration. The results of that $K^{th}$ search are stored temporarily at block 322, K is indexed one at block 330, and if a unique match is not found 320 again, the loop continues for ever more extracted features until K exceeds a maximum, wherein a "no Match Found" message is sent 334 to the MS. Once a unique match is found at block 320, a reply message 336 is sent to the MS 26 carrying the title (or other identification) of the song or file that corresponds uniquely to the database feature set that matches the extracted features. The reply message 336 also preferably carries a link directly to the matched file, which is at the song or file storage database 40 that may or may not be one with the signature database 36.

A communication link between the MS 26 and the song recognition service 34 preferably remains open between the time the MS 26 first transmits its extracted features and the time the recognition service 34 transmits its reply message 336 with the unique file identifier. In one embodiment, the MS 26 sends a first message with a first set of extracted features, and the recognition service 34 searches its database (either with or without extracting additional features). In the event no unique match is found, the recognition service 34 may send a request message to the MS 26, which may specify number and/or type of additional features it requests the MS 26 to extract (which the MS 26 may do from the digital version of the media sample stored in the buffer). For example, assume the recognition service 34 returns four matching results from the database. The recognition service is then able to determine one or more particular features by which the four might be uniquely distinguished, be it a lower level feature such as signal envelope or centroid, or a higher-level feature such as a timbral temporal distance between timbral temporal centroids. In the former, the recognition service 34 might specifically request the centroid feature for a particular spectral slice that would directly distinguish among the four; in the latter, it may request a missing timbral temporal centroid so that the recognition service may then extract the additional feature (e.g., a distance between centroids) that will distinguish between the four. The MS 26 sends another message with a second set of features extracted in that second extraction, and the recognition service 34 again searches the database. This second search of the database may use the second set of extracted features, may use a second set of additional features extracted from the second set, or a combination. In this manner, a 'dialogue' may continue between the MS 26 and the recognition service 34, with the latter calling for additional features each time a database search fails to return a unique match. Preferably, the communication link between them remains open; a packet switched network need not consume appreciable bandwidth during the times the recognition service searches the database since packets are not being transmitted.

Preferably, the song or file identification and the corresponding music service URI is returned to the communication service 30A-B, which composes the reply message to the MS 26 and sends it as an SMS/MMS or similar message to the MS 26. The recognition service server 34 also sends a message 338 to a music server 38 (where the music server is separate from the recognition service server) with the unique identifier of the MS 26 and the link to the matched file.

Figure 3C:
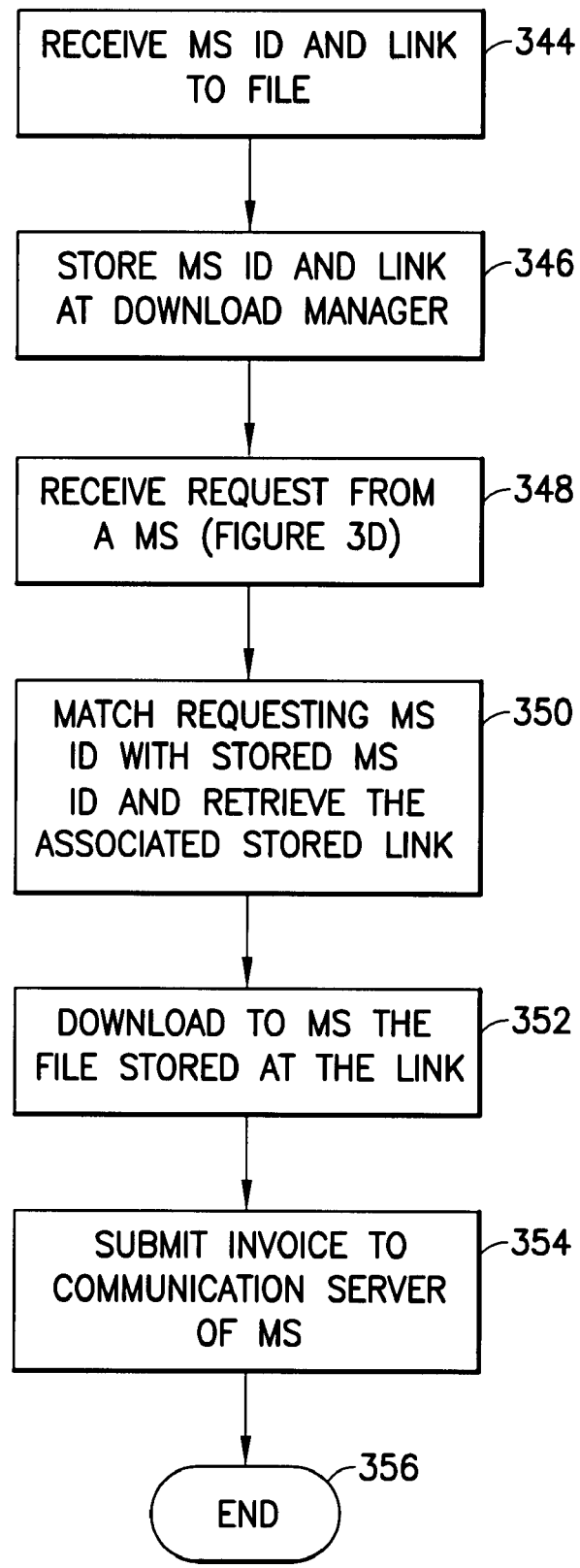

Block 342 leads to FIG. 3C, the music server 38. The music server 38 receives 344 the message from block 338 of FIG. 3B and stores 346 that information at a download manager 346, as the MS 26 may not immediately request a download of the matched file or song. Once the music server 38 receives a request from the MS 26 (see FIG. 3D), preferably soon after the MS 26 receives its reply message 336 from the recognition service server 34, it matches 350 the unique identifier of the MS 26 to the MS ID stored in the download manager 346 and retrieves the associated link to the matched file. Payment information is confirmed (preferably retained on file and matched to the MS ID following a first purchase from that MS 26) and the matched file or song is downloaded 352 to the MS 26. An invoice of the purchase is submitted 354 to the communication server 30B of that MS 26, and the process ends 356 for the network side of the method.

Figure 3D:
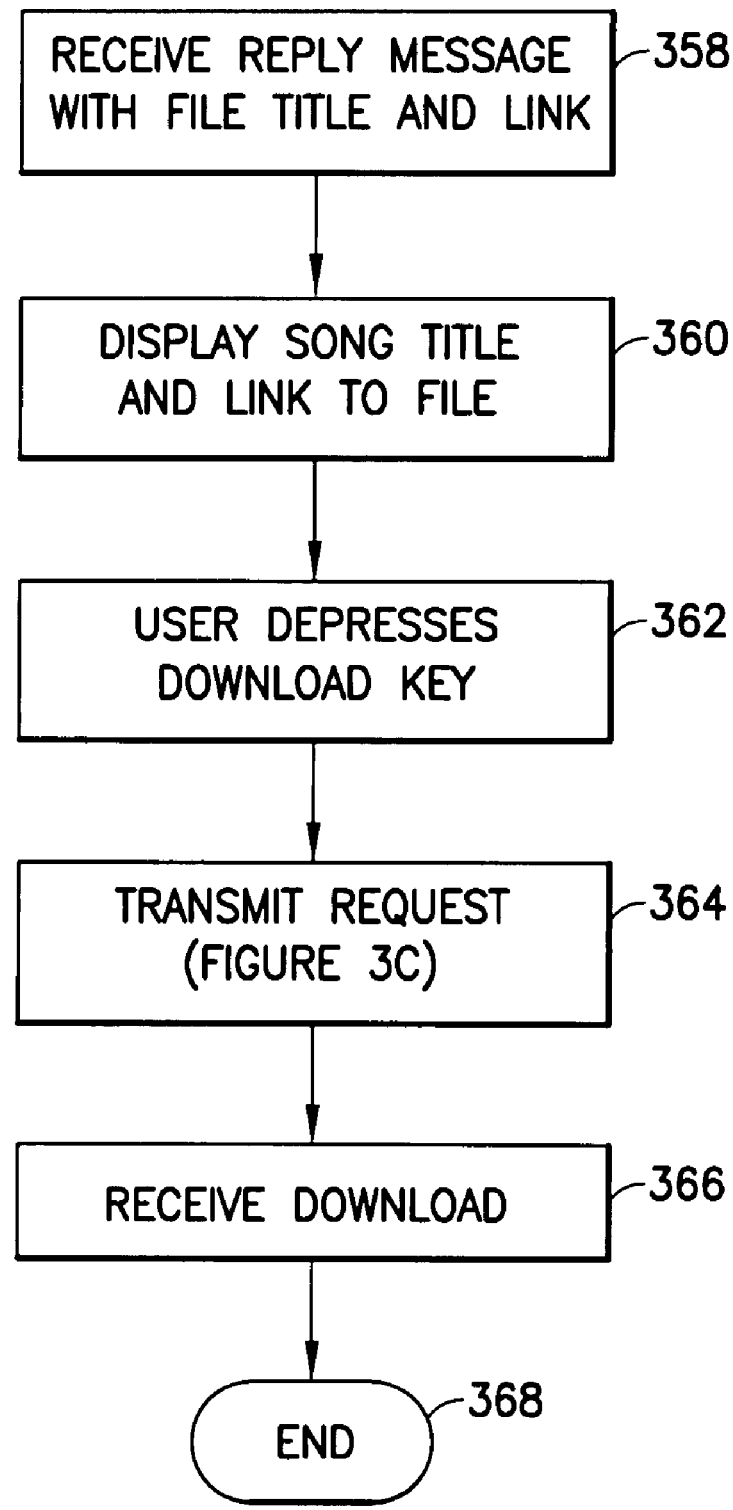

Block 340 of FIG. 3B leads to FIG. 3D which is further from the MS 26 perspective. The MS 26 receives 358 the reply message and link from block 336 (of FIG. 3B) and displays 360 the song or file title or other identifier, along with the link to it. The user depresses 362 a download key, possibly after selecting the link where the user has stored several that may be displayed simultaneously, which transmits 364 a request for the file or song noted at block 348 of FIG. 3C and which also constitutes authorization to debit or credit an account previously disclosed. The user receives 366 the downloaded file or song at the MS 26, and the method ends 368 for the MS 26 side of the transaction.

Specific components of the MS 26 will be detailed with reference to FIGS. 4A and 4B. A first transducer or microphone 48 for receiving an analog audio input (the media sample 24 previously noted) is coupled to a processor 50. The microphone 48 converts to a digital version the analog media sample 24, from which the processor 50 begins extracting features that are stored in a computer readable main storage 54. The particular algorithms used for feature extraction may be stored in the storage 54 as computer readable instructions, and the main storage 54 need not be a single coherent storage medium but may be distributed among several different storage components. The media sample may pass through a buffer storage 52 that continuously stores a finite data volume of the sample prior to it being processed. The buffer storage 52 continuously stores the signals most recently received at the microphone 48 so that, when a media sample is to have features extracted at a user command, the processor 50 can immediately begin extracting features from that portion of the media sample currently within the buffer memory 52. In this manner, features may be extracted from a portion or segment of the sample that was input into the MS at a time preceding the user input command to identify the song or file, or the establishment of the link. Because no additional processing is done to the signal stored in the buffer memory until and unless a user command requires it, minimal additional power is consumed.

The processor 50, and all components of the MS 26, is powered by a portable power source such as a rechargeable battery 56 or replaceable fuel cell. A user interface 58 includes a display interface 58A to convert an output from the processor to text messages and images discernible to a user, and a user input mechanism 58B (such as a plurality of buttons, touch or pressure sensors within the display screen 58A, or microphone 48 with voice recognition software stored in the main storage 54) by which a user may input commands/requests to the processor 50. The processor 50 is coupled to a transmitter 60 and receiver 62 through a switch 64 so that transmissions and receptions cannot occur simultaneously. Each of the transmitter 60 and receiver 62 are coupled to an antenna 66, which may be internal or external of a housing that envelops the processor 50. The processor may also provide outputs to a user at a second transducer or speaker 68. For video reception, the MS 26 may include a camera 70 or other image-capturing device to provide a visual media sample to the processor 50. Though not shown, the camera 70 may also provide an input to a video buffer memory (not shown) that operates similar to the buffer memory 52 associated with the microphone 48.

Particular aspects of the user interface of the MS 26 according to the present invention are detailed at FIG. 4B. Specifically, the display interface 58A provides an output that is recognizable to a user, and may include status icons 74 indicating signal strength, type of link, and/or battery voltage. The display screen 58A further displays text 76 and symbols 78 that may be selected by a user and indicated as such via highlighting, shading, change of background, and the like. The user input mechanism 58B may take one or more of several different forms, such as one key of an alphanumeric keypad 80, a navigation button 82, a soft key 84, or preferably a dedicated button 86 that is reserved for identifying unknown media samples and related actions. Alternate user input mechanisms 58B are detailed below. The alphanumeric keypad 80 is known in the art and is primarily used for entering text and numbers into the MS 26. The navigation button 82 operates to move a cursor or other indicator to different points on the display screen 58A. The soft keys 84 are multi-functional, and operate to execute a command that is typically displayed on the display screen 58A immediately adjacent to the relevant soft key 84.

Consistent with the illustration of FIG. 4B, assume the illustrated MS 26 has received an email that includes a digital copy of a media sample as an attachment. In such an instance, the means to receive the media sample includes the mobile telephony receiver 62. Other means to receive the media sample include the microphone 48 or camera 70, a data cable receptacle by which the MS 26 may be linked to a PC, server, or similar apparatus from which the media sample is uploaded, or a receiver for an optical link (e.g., infrared), a local area network, or a personal area network (e.g., Bluetooth®) over which the media sample is wirelessly downloaded. Regardless, the text 76 of the illustrated email requests identification, and the media file attachment is displayed on the display interface 58A as a symbol 78. Once the user selects the media file, such as is indicated on the display screen 58A by shading of the selected symbol 78, making a further input at the relevant user input mechanism causes the processor 50 to begin extracting features from the media sample (which in this example, the received media sample is the digital version from which features are extracted).

FIG. 4B illustrates three different user input mechanisms by which a user can cause the processor 50 to extract features from a media sample. Where the dedicated button 86 is used as the relevant user input mechanism, depressing that dedicated button 86 causes the processor 50 to begin extracting features. Alternatively, a soft key 84 may be enabled to do so upon the user selecting the symbol 78 (wherein a function designator 86 may be displayed on the display screen 58A adjacent to the relevant soft key 84), the navigation button 82 may cause the processor to extract features when a user depresses a central portion of the navigation button 82 after selecting the symbol 78 via entries at peripheral portions of the navigation button 82. The soft key 84 is distinguished from the dedicated button 86 in that the soft key 84 is enabled for functions beyond media sample identification and media file purchasing. Though not depicted, a touch-sensitive portion of a display screen 58A may also serve as the user input mechanism. Any of the above may be considered a button as used in the claims. The microphone 48 in conjunction with voice-recognition computer program instructions may also serve as the relevant user input mechanism that causes the processor 50 to extract a feature from the media sample upon a voice command (e.g. "recognize"), and preferably also to select a symbol 78 corresponding to a media file to be identified.

As noted above, a buffer storage 52 may be employed within the MS 26. In certain embodiments, that same user input that causes the processor 50 to extract a feature further causes the buffer 52 to begin storing, where the media sample is received via a microphone 48 or camera 70. In embodiments wherein the input mechanism may be either the transducer or opto-electronic means (e.g., data cable, wireless electronic or optical link), the input mechanism causes the processor to extract features from a media sample that is stored in the main storage or storage media 54 when a corresponding symbol 78 (or other representation of a stored media sample) is selected on the display screen, and from an input at the transducer when no symbol 78 is selected. This avoids the need for the user to make multiple inputs to direct the processor to the proper media sample.

Preferably, the MS 26 also transmits a message with the extracted feature(s) over a wireless telephony link 28 in response to the same user input that caused the processor to extract the feature(s). Considering the overall system as described above with network 32 and servers 30B, 34, 38, 42 and databases 36, 40, that message with extracted features is sent to a network address (e.g., web page) of a recognition service server 34. The display screen 58A automatically displays, in response to receiving a reply message that identifies the media sample from that server 34 (e.g., that identifies a media file that matches the media sample), an identifier of the media sample. This identifier is preferably taken directly from the reply message and may be a text identifier such as a song title, artist/title combination, track number and CD title combination, album release date, genre, artist description, and the like. Analogous text identifiers may be displayed for other identified media samples (such as image samples) that are not matched to a music or audible-related media file. The identifier may alternatively or additionally include images such as album cover art, artist's image, an icon that links to a ring tone derived from the media file, etc. While the digital media sample is to be uniquely matched to a single media file via features and servers, it is preferable but not mandatory that the identifier uniquely identify the media sample. For example, if the server returns only three media files that each match every feature extracted from the digital media sample, identifiers for all three may be sent to the MS 26, potentially with sample clips of the media files themselves attached to the respective identifier, so that the user may listen to the clips and select the one media file s/he wishes to download. Alternatively, the server may only return an icon of album cover art that links to purchasing every track on the album, rather than the single media file that is matched the digital media sample.

Once the identifier is displayed on the display screen 58A, another user input at a user input mechanism 82, 84, 86, 48 (the latter for voice recognition) causes the transmitter to send a message authorizing the purchase of a copy of the media file underlying the media sample, the one that is identified in the reply message and that may be stored at the file storage database 40 as previously described. It is expected that the sender of the reply message would also include a link to where the media file may be purchased, purchase terms and conditions, price, and other information to facilitate a wireless electronic purchase transaction. The sender may send only portions of that information once a user has agreed to the more generic aspects of such transactions in a previous exchange. The user input mechanism by which this authorization message is transmitted may be the dedicated button 86 or a soft key 84, wherein the function of the relevant button 86, 84 automatically changes upon receipt of the reply message and/or display of the identifier. In this manner, the relevant button 86, 84 actuates at least two functions: extracting features (and preferably transmitting them), and sending an authorization to purchase a copy of the identified media file. Where a dedicated button 86 is employed, preferably its functions are reserved only to the identification of media samples (e.g., feature extraction and transmittal) and purchase of media files. The dedicated button is preferable in that a user need not make multiple entries in order to set the current function of the soft key 84 or navigation button 82 to sample identification. This is because any unidentified media sample being heard in real time (e.g., a song heard over broadcast radio input via the microphone) is by its nature evanescent. Such a dedicated button 86 may further include permanent markings 90 on the button itself or on a housing of the MS 26 at a position immediately adjacent to the dedicated button 86 to identify it's limited functionality.

Preferably, the authorization message includes an identifier of the media file (which may be merely an address in a signature 36 or storage 40 database that was received in the reply message) and authorization to debit or credit a financial account such as might underlie a credit or debit card. Specifics of the account (e.g., credit card number, expiration, billing address, etc.) necessary to effect the purchase transaction may be within the authorization message or stored at a server 42 and recalled using a security code that is included in the authorization message. Preferably, the authorization message authorizes an immediate download of the identified media file to the MS 26, though the authorization message (and its originating user input) need not be initiated immediately after receiving the reply message: the reply message and text identifier may be stored by the user in the main storage 52, such as a stored email, and recalled for later purchase of the media file.

FIG. 5 is a timing diagram depicting the advantage gained in buffering inputs at the MS 26. A media sample 501 is received at the MS 26 beginning at a start 502. A user listens beginning at that start 502, and after determining that it is a song or file for which he/she would like a copy, the user depresses, for example, a dedicated recognition button 86 at a request time 504. Assume a minimum (time-bounded) media sample ΔT is required for the MS 26 to perform its preprocessing. This is not the processing time, but rather the amount of the song (e.g., ten seconds) necessary to extract sufficient features by which to identify the entire song or file. Where a buffer 52 is employed, ΔT begins at a time 506 preceding the user request time 504 and extends the requisite minimum sample time to a buffered sample end time 508. Where no buffer is employed, the earliest time at which the media sample can be captured is at the request time 504. The requisite minimum sample time then must end 510 at a time later than the buffered sample end time 508. Depending upon the amount of time it takes the MS 26 to process the buffered segment of the media sample 24, the difference 512 between the two end times 508, 510 may be as much as the difference in media sample start times 506, 504. Because the MS 26 preferably maintains a continuous wireless link 28 from its transmission of the preprocessed features and receiving the reply message, this difference 512 can only enhance the user's experience by reducing delays.

In summary, the present invention includes a user interface and a mobile station that is particularly adapted to perform feature extraction from an input media sample, whether that input is analog or digital. There is novel functionality where identification of a media sample lays on a single button of the MS 26, whether dedicated 86 or not 84, 82. Pressing the button causes feature extraction and transmittal at the MS 26, and upon receiving a reply message, the automatic displaying of a text identifier of a media file underlying the (formerly unidentified) media sample. Further, the same or a separate button may be used to effect a purchase of the media file once the reply message identifying it is received and the text identifier is displayed.

While there has been illustrated and described what is at present considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. An apparatus comprising:
   at least one processor; and
   at least one memory including computer program code for one or more programs,
   the at least one memory and the computer program code configured to, with the at least one processor, cause the apparatus to perform at least the following,
   in response to an input, extract from a received media file a set of features that quantify characteristics of content of the media file;
   wirelessly transmit to a media file recognition service a message that comprises the extracted set of features;
   receive a request message from the media file recognition service that comprises a list of additional features;
   in response to the received request message, extract a set of additional features from the media file according to the list;
   wirelessly transmit to the media file recognition service another message including the extracted additional set of features; and
   receive, from the media file recognition service, at least an identification of the media file.

2. An apparatus of claim 1, wherein each of the set of features comprise multimedia content description interface (MPEG-7) descriptors.

3. An apparatus of claim 1 wherein the apparatus is further caused to adaptively select a number and type of features of the first set to extract based on a type of the media file.

4. An apparatus of claim 3, wherein the adaptive selection comprises M stages of feature extraction, and further wherein the message comprises the extracted set of features and the number M of stages.

5. An apparatus of claim 1, wherein the message does not include a clip from the media file.

6. An apparatus of claim 1, wherein the apparatus is further caused to display the media file name received in the identification message.

7. An apparatus of claim 6, wherein the identification message further comprises a link from which the media file named in the identification message is available for download.

8. An apparatus of claim 7, wherein the the apparatus is further caused to receive an additional user input to wirelessly download the media file named in the identification message.

9. An apparatus of claim 8, wherein the apparatus comprises a dedicated button.

10. An apparatus of claim 1, wherein the features include a waveform envelope, harmonic frequency, spectral centroid, silence, or a combination thereof.

11. A method comprising:
   in response to an user input, extracting from a received media file a set of features that quantify characteristics of content of the media file;
   causing, at least in part, actions that result in wireless transmission of to a media file recognition service a message that comprises the extracted set of features;
   causing, at least in part, actions that result in reception of a request message from the media file recognition service that comprises a list of additional features;
   in response to the received request message, extracting a set of additional features from the media file according to the list;
   causing, at least in part, actions that result in wireless transmission to the media file recognition service another message including the extracted additional set of features; and
   causing, at least in part, actions that result in reception, from the media file recognition service, at least an identification of the media file.

12. A method of claim 11, wherein each of the set of features comprise multimedia content description interface (MPEG-7) descriptors.

13. A method of claim 11 wherein extracting comprises determining a type of the media file, and adaptively selecting a number and type of features of the set to extract based on the determined type of the media file.

14. A method of claim 13, wherein adaptively selecting comprises selecting M stages of feature extraction, and further wherein the message comprises the extracted set of features and the number M of stages.

15. A method of claim 11, wherein the message does not include a clip from the media file.

16. A method of claim 11, further comprising
automatically displaying the media file name received in the identification message.

17. A method of claim 16, wherein the identification message further comprises a link from which the media file named in the identification message is available for download, and wherein displaying comprises displaying the media file name and the link.

18. A method of claim 17, further comprising, responsive to an additional user input at the same user input mechanism at which the said user input was received, wirelessly receiving the media file named in the identification message.

19. A method of claim 11, wherein the features include a waveform envelope, harmonic frequency, spectral centroid, silence, or a combination thereof.

20. A computer-readable storage medium carrying one or more sequences of one or more instructions which, when executed by one or more processors, cause an apparatus to at least perform the following steps:
   in response to an user input, extracting from a received media file a set of features that quantify characteristics of content of the media file;
   wirelessly transmitting to a media file recognition service a message that comprises the extracted set of features;
   receiving a request message from the media file recognition service that comprises a list of additional features;
   in response to the received request message, extracting a set of additional features from the media file according to the list;
   wirelessly transmitting to the media file recognition service another message including the extracted additional set of features; and
   receiving, from the media file recognition service, at least an identification of the media file.

21. A computer-readable storage medium of claim 20, wherein each of the set of features comprise multimedia content description interface (MPEG-7) descriptors.

22. A computer-readable storage medium of claim 20 wherein extracting comprises determining a type of the media file, and adaptively selecting a number and type of features of the set to extract based on the determined type of the media file.

23. A computer-readable storage medium of claim 22, wherein adaptively selecting comprises selecting M stages of feature extraction, and further wherein the message comprises the extracted set of features and the number M of stages.

24. A computer-readable storage medium of claim 20, wherein the message does not include a clip from the media file.

25. A computer-readable storage medium of claim 20, wherein the apparatus is caused to further perform:
   automatically displaying the media file name received in the identification message.

26. A computer-readable storage medium of claim 25, wherein the identification message further comprises a link from which the media file named in the identification message is available for download, and wherein displaying comprises displaying the media file name and the link.

27. A computer-readable storage medium of claim 20, wherein the features include a waveform envelope, harmonic frequency, spectral centroid, silence, or a combination thereof.

* * * * *